Dec. 9, 1952        G. MINAS                2,620,570
              EARTH INDUCTION COMPASS
                Filed June 6, 1950
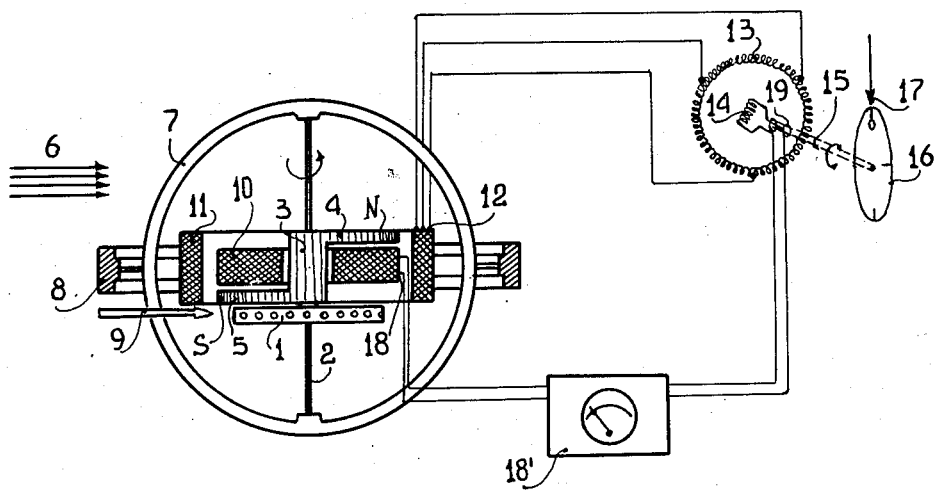

Patented Dec. 9, 1952

2,620,570

UNITED STATES PATENT OFFICE 2,620,570

EARTH INDUCTION COMPASS

Giorgio Minas, Genoa, Italy

Application June 6, 1950, Serial No. 166,438
In Italy December 22, 1949

2 Claims. (Cl. 33—204)

The present invention relates to an earth induction compass and particularly to an earth induction compass having a permanent magnet.

It is an object of the present invention to provide an earth induction compass of the kind described which is very simple.

An earth induction compass according to the present invention comprises in its broadest aspect a gyroscopic member including a permanent magnet having a Z-shaped body, the Z-shaped body having a middle part arranged substantially parallel to, and coaxially with, the axis of rotation of the gyroscopic member, the Z-shaped body having a first arm and a second arm arranged at opposite ends of the middle part substantially at right angles thereto and extending in opposite directions so as to form with the middle part an annular space, a stationary single phase winding arranged around, and coaxially with, the middle part and substantially within the annular space, the stationary single phase winding producing a first single phase current having a frequency proportional to the speed of rotation of the gyroscopic member, and a phase dependent on the direction of the earth's magnetic field with respect to the gyroscopic member, a stationary three-phase winding arranged coaxially with the Z-shaped body and at a distance from the axis of the gyroscopic member so as to enclose the arms of the Z-shaped body, means for deriving from the three-phase winding a second single phase current having the same frequency as the first single phase current produced by the stationary single phase winding, and means connected to the stationary single phase winding and the deriving means for comparing the phases of the single phase currents produced by the stationary single phase winding and derived by the deriving means from the three-phase winding, respectively.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the single figure is a diagrammatic showing of an earth induction compass according to the present invention.

Referring now to the drawing a gyroscopic member including a permanent magnet 3, 4, 5 having a Z-shaped body is provided. A turbine wheel 1 is rigidly connected to a vertical axle 2 on which the Z-shaped permanent magnet is fitted consisting of the three following parts: The vertical-middle part 3 arranged substantially parallel to and coaxially with the axis of rotation of the gyroscopic member, and the two radial horizontal arms 4 and 5 arranged at opposite ends of the middle part 3 substantially at right angles thereto and extending in opposite directions so as to form with the middle part 3 an annular space. The permanent magnet is shown as having a north pole (N) at the end of arm 4 and a south pole (S) at the end of arm 5. 6 indicates the external magnetic field. The rotating mass which constitutes a free gyroscopic member owing to the cardanic arrangement of the gimbal-rings 7 and 8 is formed by the magnetic element 3, 4, 5, and by the turbine-wheel 1. 9 is the nozzle of an air jet which causes the rotation of the revolving parts of the appliance. Concentrically to the vertical part 3 of the magnet and between the inner sides of arms 4 and 5 a stationary single phase winding 10 is wound, whilst a stationary three phase winding 11 is fitted so as to surround the winding 10 and the ends of the arms 4 and 5. By means of terminals 12 the current, generated in winding 11 is taken off in order to be conveyed to another three-phase winding 13 wherein it generates a rotating field having the same frequency and phase as those of the rotating magnet 3-4-5. In the center of this rotating field a movable single phase winding 14 is arranged on an axle 15 so that it can rotate; on the axle 15 a dial 16 is fitted the bearing of which is determined in connection with a variable guide-line 17. By means of terminals 18 the current generated in the winding 10 is taken off in order to be conveyed to an electrical bridge or comparison device 18' to which the current derived from the winding 14 by means of the rings 19 is also conveyed.

The appliance is operated as follows:

The magnetic element 3, 4, 5 put in motion by turbine 2 induces in the winding 10 under the influence of the external magnetic field 6 an alternating current of sinusoidal shape as a result of the increase or decrease of its magnetic moment. In effect, the two arms 4 and 5 of the magnet which are placed in the external magnetic field 6 which is parallel to the planes in which the two arms are located, are subjected to an increase or decrease of their magnetic moment in dependence on their polarity having either the same direction as the field 6 or the opposite direction. The current induced in winding 10 has a frequency corresponding to the number of revolutions of the rotating parts of the device and a phase corresponding to the lines of force of field 6. Owing to its permanent magnetism, the magnetic element 4, 3, 5 is also working as a three-phase generator by means of the winding 11 with the same frequency as that of the current generated by winding 10 but with a phase depending on the position of the arms 4 and 5. The device operated by the turbine acts as a stabilizing gyroscope owing to the rotating masses and generates at the same time two separate currents of the same frequency but having variable phases, the one depending on the external magnetic field 6, whilst the other depends on the position of the winding 14 in the rotating field of winding 13. At first, by means of the comparison device 18' it is ascertained whether the two phases are in agreement or not. If there is no agreement between them it will be necessary to rotate the winding 14 by means of the dial 16 until the exact agreement of phase between the two currents is obtained and then the guide-line 17 will be fixed on the zero of dial 16. Any further variation in the direction of the external magnetic field 6 causes an unbalancing of the device 18' thus necessitating to shift the graduated dial 16 to a new position, in order to restore the balancing and at the same time enabling to read the value in degrees of the angular variation that has taken place in magnetic field 6, by the angle betwen the guide-line 17 and the zero graduation of the dial 16.

Having now particularly described and ascertained the nature of my above said invention and in what manner the same is to be performed, I declare that what I claim is:

1. An earth induction compass comprising in combination, a gyroscopic member including a permanent magnet having a Z-shaped body, said Z-shaped body having a middle part arranged substantially parallel to, and coaxially with, the axis of rotation of said gyroscopic member, said Z-shaped body having a first arm and a second arm arranged at opposite ends of said middle part substantially at right angles thereto and extending in opposite directions so as to form with said middle part an annular space; a stationary single phase winding arranged around, and coaxially with, said middle part and substantially within said annular space, said stationary single phase winding producing a first single phase current having a frequency proportional to the speed of rotation of said gyroscopic member, and a phase dependent on the direction of the earth's magnetic field with respect to said gyroscopic member; a stationary three-phase winding arranged coaxially with said Z-shaped body and at a distance from the axis of said gyroscopic member so as to enclose said arms of said Z-shaped body; means for deriving from said three-phase winding a second single phase current having the same frequency as the first single phase current produced by said stationary single phase winding; and means connected to said stationary single phase winding and said deriving means for comparing the phases of the single phase currents produced by said stationary single phase winding and derived by said deriving means from said three-phase winding, respectively.

2. An earth induction compass comprising in combination, a gyroscopic member including a permanent magnet having a Z-shaped body, said Z-shaped body having a middle part arranged substantially parallel to, and coaxially with, the axis of rotation of said gyroscopic member, said Z-shaped body having a first arm and a second arm arranged at opposite ends of said middle part substantially at right angles thereto and extending in opposite directions so as to form with said middle part an annular space; a stationary single phase winding arranged around, and coaxially with, said middle part and substantially within said annular space, said stationary single phase winding producing a first single phase current having a frequency proportional to the speed of rotation of said gyroscopic member, and a phase dependent on the direction of the earth's magnetic field with respect to said gyroscopic member; a first stationary three-phase winding arranged coaxially with said Z-shaped body and at a distance from the axis of said gyroscopic member so as to enclose said arms of said Z-shaped body, said permanent magnet in rotation within said first stationary three-phase winding inducing therein a three-phase current having the same frequency as said first single phase current produced in said stationary single phase winding; a second stationary three-phase winding connected to said first stationary three-phase winding; a movable single phase winding arranged for cooperation with said second stationary three-phase winding so as to produce in said movable single phase winding a second single phase current having the same frequency as the first single phase current produced by said stationary single phase winding; and means connected to said stationary and said movable single phase windings are comparing the phases of the single phase currents produced therein.

GIORGIO MINAS.

REFERENCES CITED

The following references are of record in the file of this patent:

UNITED STATES PATENTS

| Number | Name | Date |
|---|---|---|
| 1,774,458 | Tear | Aug. 26, 1930 |
| 2,201,559 | Moseley | May 21, 1940 |

FOREIGN PATENTS

| Number | Country | Date |
|---|---|---|
| 500,645 | Germany | June 24, 1930 |